Figure 1:
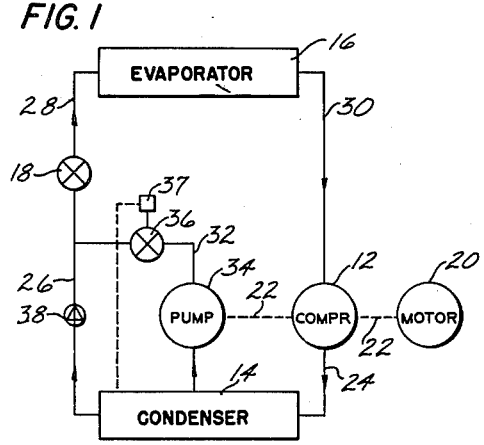

March 19, 1963     H. F. BROSE ET AL     3,081,606

REFRIGERATION SYSTEM FOR LOW TEMPERATURE OPERATION

Filed March 6, 1961

*INVENTORS*
HARLAN F. BROSE
RICHARD J. COBURN

BY *Teller, McCormick, Paulding & Huber*

*ATTORNEYS*

United States Patent Office 3,081,606
Patented Mar. 19, 1963

3,081,606
REFRIGERATION SYSTEM FOR LOW
TEMPERATURE OPERATION
Harlan F. Brose, Longmeadow, Mass., and Richard J. Coburn, Bloomfield, Conn., assignors to United Aircraft Corporation, East Hartford, Conn., a corporation of Delaware
Filed Mar. 6, 1961, Ser. No. 93,546
6 Claims. (Cl. 62—197)

This invention relates to refrigeration systems, and relates more particularly to a refrigeration system particularly adapted for operation at low ambient temperatures.

Although not limited to any special use, the refrigeration system of the present invention finds particular utility in connection with air-conditioning and other cooling apparatus employed in modern high altitude aircraft. While operating at normal cruising altitudes these aircraft often encounter extremely cold temperatures which may be as low as −60° or −80° F. The refrigeration equipment is generally not operated continuously while the aircraft is subjected to such low ambient temperatures; however, it is desirable that the equipment be capable of starting and operating at the low temperatures accompanying high altitude flight preparatory to descending to a lower altitude, as when landing. This is to assure that the required cooling capacity will be available immediately when the aircraft reaches the higher ambient temperatures present at the lower altitudes.

In the past, it has been difficult to provide refrigeration systems capable of starting and operating properly at temperatures in the neighborhood of −60° to −80° F. or lower. This is due to the fact that the usual refrigerants at these low temperatures have relatively low absolute vapor pressures, and the gas compressors normally used with the refrigeration systems are unable to boost this pressure to a pressure sufficient to force the refrigerant through the expansion valve and other parts of the system at a rate adequate for the system to pick up a load and operate properly. That is, the vapor pressure existing in the system is so low that the gas compressor operates in an atmosphere approximating a vacuum and is therefore unable to move refrigerant through the system to cause the system to start operating.

The fact that the gas compressor is unable to immediately move refrigerant through the system to start its operation has a secondary disadvantage. In many refrigeration systems employing gas compressors it is customary to lubricate the compressor bearings by means of oil or other lubricants mixed with the refrigerant, the flow of the refrigerant through the compressor being relied upon to carry lubricant to its bearings. Thus when little refrigerant passes through the compressor the bearings will not be properly lubricated and will be in danger of being burned out if the compressor is operated for any length of time under such conditions.

The general object of this invention is therefore to provide a refrigeration system capable of starting up and operating properly while the parts of the system are subjected to a very low ambient temperature in the order of −60° or −80° F., or even lower.

Another object of this invention is to provide a means for preventing bearing failure in the gas compressor of a refrigeration system of the type wherein the gas compressor is lubricated by means of oil mixed with the refrigerant when the system is started up at a low ambient temperature.

A more specific object of this invention is to provide a means for initially increasing the pressure of the refrigerant of a refrigeration system at various points in the system to enable the same to begin operation when the refrigerant pressure is otherwise too low to enable the gas compressor and other parts thereof to operate properly.

A further object of this invention is to provide a refrigeration system including a liquid pump for pumping liquid refrigerant from the condenser when the outlet pressure of the compressor is inadequate to move the refrigerant through the system. In keeping with this object of the invention it is a further object to provide a system whereby the aforesaid liquid pump may be mounted on the compressor shaft and thereby driven by the same power source used by the compressor so as to effect a weight saving and improve the reliability of the system.

Other objects and advantages of the invention will be apparent from the drawing and from the following description.

The drawing shows the preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a schematic diagram of a refrigeration system embodying the present invention.

FIGS. 2 to 5, inclusive, are schematic diagrams of refrigeration systems comprising alternative embodiments of the invention.

Referring first to FIG. 1 of the drawing, there is shown in schematic form a refrigeration system which is in general of the type commonly used commercially for many different cooling applications. That is, it is a system which relies upon the evaporation and condensation of a liquid refrigerant, such as one of the various Freon compounds, having a relatively low boiling temperature.

During normal operation the principal active parts of this system consist essentially of a compressor 12 driven by a suitable power source, a condenser 14, an evaporator 16 and an expansion valve 18. In the case where the system is used in an aircraft the power source may comprise an electric motor, as indicated at 20, which is powered by electricity produced by an auxiliary generating device driven by one of the engines and which may be selectively started or stopped to start or stop the operation of the system. The dashed line 22 in FIG. 1 represents a shaft connecting the compressor with the motor so that the motor drives the compressor. Work is supplied by the motor to the compressor, and in the compressor the refrigerant, as a vapor or gas, is raised in pressure.

The above mentioned parts are connected in series by suitable lines or conduits so that the refrigerant may flow therethrough in a closed thermodynamic cycle.

The pressurized or compressed vapor or gas leaving the compressor 12 flows through a line 24 to the condenser 14. The condenser in turn is a heat exchanger wherein heat is removed from the compressed vapor causing it to condense to a liquid. The condensed liquid in the condenser 14 then flows, because of the pressure existing in the condenser, through the line 26 to the expansion valve 18. As it flows through the expansion valve, the liquid refrigerant is reduced in pressure and expanded, causing at least some of the liquid to be evaporated, and this evaporation produces a cooling effect on the gas and liquid leaving the expansion valve.

The expanded and cooled refrigerant thereafter flows through the line 28 to the evaporator 16 in which the remaining liquid part of the refrigerant is converted to vapor by the absorption of heat from the space to be cooled. This vapor is then withdrawn from the evaporator through the line 30 and conducted to the compressor 12 where the cycle as above described is again repeated.

The system as so far described is entirely conventional, but, as already mentioned, presents starting difficulties at low temperatures. If the system is allowed to remain idle for some time at a low ambient temperature, the vapor pressure of the refrigerant in all the parts of the system, including the line 30, will be reduced to a low value corresponding to the low ambient temperature. For example, in the case where the refrigerant is Freon-11 or Freon-114, if the system while idle is soaked to a temperature in the neighborhood of −60° to −80° F. the absolute pressure of the refrigerant vapor in the line 30 will be reduced to about one p.s.i. or even less. With this low inlet pressure the compressor 12, when started, is usually unable to effect much of a pressure boost, especially in the case of a centrifugal compressor. The developed outlet pressure in the line 24 and condenser 14 therefore in many cases may be no more than 3 to 5 p.s.i.a. This pressure is in turn generally inadequate to force liquid refrigerant from the condenser 14 through the expansion valve 18, or at least is inadequate to force it through at a sufficient rate to cause an appreciable increase in the evaporator or compressor inlet pressure. Thus, the compressor 12 may run for an indefinite length of time with a low rate of flow therethrough, and without rendering the system completely operable, until the pressure in the evaporator and in the line 30 gradually, if ever, builds up to a proper operating pressure.

To overcome this problem, and in accordance with the present invention, all of the systems shown by the drawing further include means operable at start-up for withdrawing liquid refrigerant from the condenser and for boosting the pressure of the withdrawn refrigerant above the condenser pressure to cause the same to flow through the system when the condenser pressure is insufficient to cause adequate or normal flow. In the illustrated system of FIG. 1 this means more specifically comprises a by-pass line 32 connected between the condenser 14 and a point in the main line 26 upstream from the expansion valve 18. The connection between the line 32 and the condenser 14 is such that the line is in communication with the liquid portion of the refrigerant contained therein. Connected in the line 32 is a liquid pump 34 of the centrifugal or non-positive displacement type which when operated serves to withdraw liquid refrigerant from the condenser 14 and to increase its pressure so as to force the same through the downstream portion of the by-pass line 32 and other parts of the system. Cooperating with the liquid pump 34 is a valve 36 also connected in the line 32 and movable between open and closed positions to permit or prevent the flow of refrigerant through the line 32. A check valve 38 is located in the line 26 upstream from the expansion valve 18. The downstream end of the line 32 is in turn connected with the main line 26 between the check valve 38 and the expansion valve 18. The valve 36 may be a manually operable valve, but is preferably operated automatically in response to the temperature or pressure of the refrigerant in a given part of the system. For example, as indicated diagrammatically in FIG. 1, the valve 36 may include a pressure sensitive means 37, such as a solenoid and pressure sensitive switch, adapted to operate the valve in response to the pressure of the refrigerant in the condenser so that the valve is open when the condenser pressure is at a relatively low value and is closed when the condenser pressure reaches a predetermined higher value. The check valve 38 in turn acts to allow normal forward flow of refrigerant through the main line 26 from the condenser to the expansion valve and to prevent reverse flow of refrigerant through the same line when the pump 34 is effective to by-pass refrigerant through the line 32.

The illustrated pump 34 is preferably a centrifugal pump which is mounted on and driven by the same shaft 22 as the compressor 12. This effects a weight saving by eliminating the need for a separate power source for driving the pump 34 and also improves the reliability of the system by eliminating the possibility of a pump motor failure. It is of course contemplated, however, that a separate drive motor for the pump 34 could be provided if desired.

To consider the operation of the system shown by FIG. 1, assume that the system has been idled for some time at a relatively low temperature so that the vapor pressure of the refrigerant in all parts of the system is relatively low. The system is now started by energizing the motor 20 to drive the shaft 22 and the compressor 12 and pump 34 connected therewith. At this time the valve 36 is conditioned, as by the low pressure in the condenser 14, so as to be open to allow the flow of liquid refrigerant through the by-pass line 32. The operation of the compressor 12, because of the low vapor pressure in the line 30, is initially unable to rapidly build up pressure in the condenser and to thereby force liquid through the line 26. The operation of the pump 34, however, causes the withdrawal and pressurization of liquid refrigerant from the condenser 20. This latter refrigerant is then introduced to the main line 26 between the check valve 38 and the expansion valve 18. The check valve 38 prevents the pressurized refrigerant from returning to the condenser, and therefore it is compelled to pass through the expansion valve 18. As the refrigerant thus flows through the expansion valve the pressure in the evaporator and the line 30 gradually increases to a normal operating pressure whereat the compressor 12 is capable of developing an output pressure in the line 24 and condenser sufficient to force liquid refrigerant from the condenser through the expansion valve 18. Once this occurs the valve 36 is closed, as by the increased pressure in the condenser, to prevent further flow through the line 32. Thereafter the pump 34 will run without any flow occurring therethrough, and the flow of refrigerant from the condenser to the evaporator will occur in a normal fashion through the main lines 26 and 28.

The other figures of the drawing show some of the various other means which may be employed for withdrawing refrigerant from the condenser and for boosting its pressure to cause immediate flow through the system when starting the same at a low ambient temperature. In each of these figures the basic system is the same as that shown in FIG. 1, and therefore the principal parts of the system have been given the same reference numerals as the corresponding parts of the FIG. 1 system and the operation of the basic system need not be redescribed in each case.

Figure 2:
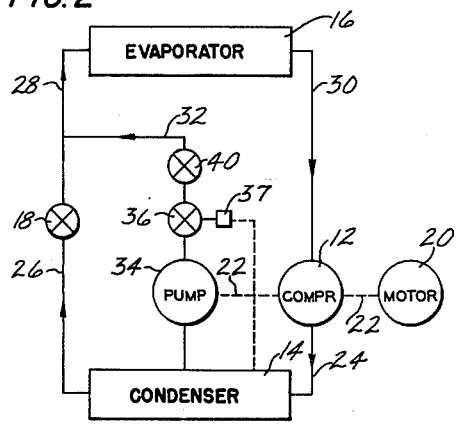

In the FIG. 2 embodiment the means for withdrawing and boosting the pressure of refrigerant from a condenser differs from that of FIG. 1 in that the downstream end of the by-pass line 32 is connected with the main line 28 between the condenser and evaporator downstream from the main expansion valve 18. Additionally the by-pass line 32 contains its own auxiliary expansion valve 40 located downstream from the pump 34. With this arrangement the check valve 38 of the FIG. 1 system is unnecessary and may be eliminated. Liquid refrigerant passing through the auxiliary expansion valve 40 is throttled down to the evaporator pressure which is lower than the condenser pressure, and therefore no reverse flow through the main expansion valve will result.

Similar to the FIG. 1 system, the pump 34 is a centrifugal or other non-positive displacement type of pump and is preferably connected with the compressor shaft 22 so as to be driven in unison with the compressor, although a separate drive motor for the pump may be provided. Likewise, the valve 36 for controlling flow through the by-pass line 32 may be operated in various different manners, but is preferably operable in response to the temperature or pressure of the refrigerant at a given point in the system. As illustrated the valve is a solenoid actuated valve responsive to the condenser pressure. During the initial start-up period at low temperatures the low pressure exising in the condenser conditions the valve 36 to permit flow through the by-pass line 32. As the condenser pressure rises, however, it eventually reaches a predetermined value at which the valve 36 is closed. Thereafter the system operates in its normal manner.

Figure 3:
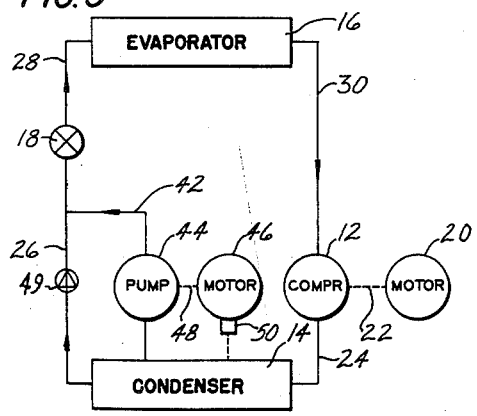

In the FIG. 3 embodiment of the invention there is provided a by-pass line 42 which is connected at its downstream end with the main line 26 upstream from the expansion valve 18. In the line 42 is a pump 44 which is of a positive-displacement type or other type through which no fluid can pass while the pump is inactive. This pump is driven separately from the compressor 12 by a separate drive means, such as an electric motor 46 coupled with the pump by a drive shaft 48, which may be selectively started and stopped to respectively cause or prevent the flow of refrigerant through the by-pass line. Upstream from the point at which the line 42 is connected with the line 26, the line 26 contains a check valve 49 arranged to permit normal forward flow from the condenser to the expansion valve and to prevent flow in the reverse direction. Thus, when the pump 44 is operated the refrigerant withdrawn by the by-pass line is compelled to pass through the expansion valve 18. This in turn, as with the FIG. 1 system, causes the evaporator pressure to rapidly build up to the point where the compressor is able to operate normally so as to produce a condenser pressure adequate to cause normal flow through the system.

In the operation of the FIG. 3 system the pump motor 46 is started at the same time as the compressor motor 20 when the system is started from a low ambient temperature. This produces a flow through the by-pass line 42, by operation of the pump 44, to initiate operation of the system. After the condenser pressure builds up to a proper value the motor 46 is stopped, stopping flow through the line 42, and the system thereafter operates in the normal manner. The motor 46 may be operated manually or may be operated automatically in response to the energization of the compressor motor 20 and the temperature or pressure of the refrigerant in a given part of the system. For example, as shown diagrammatically, the motor 46 may be controlled by a pressure sensitive switch 50 responsive to the pressure existing in the condenser 14. The electrical input terminal or terminals of the switch 50 are in turn connected with the corresponding input terminal or terminals of the compressor 20. When the condenser pressure is low, corresponding to a low ambient temperature, the switch 50 is closed so that the pump motor 46 will be energized simultaneously with the compressor motor 20. As the condenser pressure increases to a predetermined value, however, the switch 50 opens to de-energize the pump motor and deactuate the pump to stop further flow through the by-pass line.

Figure 4:
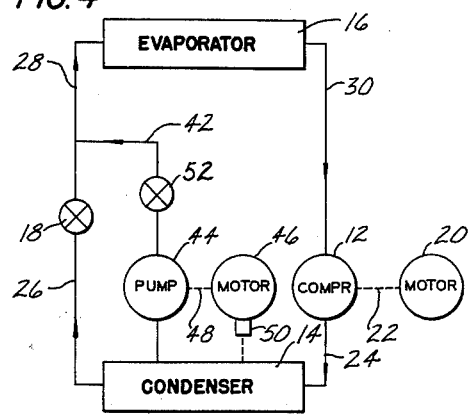

The embodiment shown in FIG. 4 is similar to that shown in FIG. 3, except that the by-pass line 42 is provided with an auxiliary expansion valve 52, located downstream from the pump 44, and the downstream end of the by-pass line is connected with the main line 28 downstream from the main expansion valve 18. The liquid withdrawn through the by-pass line therefore passes through the auxiliary expansion valve 52, and from there passes directly to the evaporator without passing through the main expansion valve. This arrangement eliminates the need for the check valve 50 provided in the FIG. 3 system.

Figure 5:
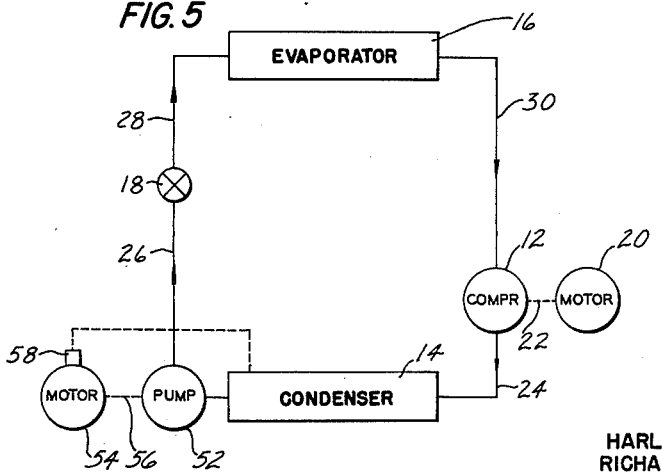

In the embodiment shown in FIG. 5 the need for a separate by-pass line is eliminated. Here the means for withdrawing refrigerant from the condenser and for boosting its pressure consists merely of a pump 52 located in the main line 26 between the condenser 14 and the expansion valve 18. The pump 52 is a centrifugal pump or other type of pump through which liquid refrigerant may pass in a normal manner when the pump is inoperative. The pump 52 is driven by suitable means, such as an electric motor 54 and drive shaft 56, whereby the pump may be started or stopped, as desired, separately from the compressor 12. When the condenser pressure is too low to cause adequate flow through the expansion valve 18 the pump 52 is operated by the motor 54 to increase the flow. When the condenser pressure builds up to an acceptable value the motor and pump are stopped and the condenser pressure by itself is relied upon to cause flow through the pump 52 and line 26 to the expansion valve. The motor may be controlled manually, but, similar to the pump motor 46 of the FIG. 3 or FIG. 4 system, is preferably operated automatically in response to the energization of the compressor motor and the temperature or pressure of the refrigerant in a given part of the system. As illustrated, for example, the motor 52 may be controlled by a pressure sensitive switch 58 responsive to the condenser pressure. The electrical input terminal or terminals of the switch 58 are connected to the corresponding terminal or terminals of the compressor motor 20. When the condenser is low, corresponding to a low ambient temperature, the switch 58 is closed so that the pump motor 54 will be energized simultaneously with the compressor motor 20. As the condenser pressure increases to a predetermined value, however, the switch 58 opens to de-energize the pump motor and deactuate the pump to terminate any further increase in the pressure of the refrigerant supplied to the expansion valve.

The invention claimed is:

1. The combination in a refrigeration system utilizing a low boiling point refrigerant which flows in a closed cycle through said system and including an evaporator, a condenser, a first line between said evaporator and said condenser for conducting refrigerant from said evaporator to said condenser, a second line between said evaporator and condenser for conducting refrigerant from said condenser to said evaporator, means in said first mentioned line for compressing the refrigerant flowing therethrough, and means in said second line for expanding the refrigerant flowing therethrough, of a by-pass line for withdrawing liquid refrigerant from said condenser, a pump in said by-pass line operable to boost the pressure of the withdrawn refrigerant above the condenser pressure, a valve in said by-pass line operable to prevent or permit flow of refrigerant therethrough, and a check valve in said second line between said condenser and said expansion means for preventing reverse flow through said latter line, the downstream end of said by-pass line being connected with said second line between said check valve and said expansion means so that the withdrawn refrigerant is prevented by said check valve from returning to said condenser and is caused instead to flow through said expansion means to said evaporator to initiate normal flow through the system.

2. The combination as defined in claim 1 further characterized by drive means for said compressing means which drive means includes a power source and a drive shaft connected between said power source and said compressing means, and said pump being a centrifugal pump connected with said drive shaft so as to be driven by the same power source as said compressing means.

3. The combination as defined in claim 1 further characterized by means for operating said valve in response to the condenser pressure whereby said valve is opened when the condenser pressure is at a relatively low value and is closed when the condenser pressure reaches a predetermined higher value.

4. The combination in a refrigeration system utilizing a low boiling point refrigerant which flows in a closed cycle through said system and including an evaporator, a condenser, means for compressing refrigerant from said evaporator and for conducting the same to said condenser, and means for expanding refrigerant from said condenser and for conducting the same to said evaporator, of a by-pass line communicating with said condenser, a pump in said by-pass line for withdrawing refrigerant from said condenser and for boosting the pressure of the withdrawn refrigerant above the condenser pressure, a common drive means for both said pump and said compressing means which drive means includes a drive shaft connected between said pump and said compressing means, means for returning the withdrawn refrigerant to the system for flow through said evaporator and said compressing means and back to said condenser, a valve in said by-pass line operable to prevent or permit flow of refrigerant therethrough, and means for operating said valve in response to the condenser pressure whereby said valve is opened when the condenser pressure is at a relatively low value and is closed when the condenser pressure reaches a predetermined higher value.

5. The combination in a refrigeration system utilizing a low boiling point refrigerant which flows in a closed cycle through said system and including an evaporator, a condenser, means for compressing refrigerant from said evaporator and for conducting the same in said condenser, and means for expanding refrigerant from said condenser and for conducting the same to said evaporator, of a by-pass line communicating with said condenser, a pump in said by-pass line for withdrawing refrigerant from said condenser and for boosting the pressure of the withdrawn refrigerant above the condenser pressure, a common drive means for both said pump and said compressing means which drive means includes a drive shaft connected between said pump and said compressing means, means for returning the withdrawn refrigerant to the system for flow through said evaporator and said compressing means and back to said condenser, a valve in said by-pass line operable to prevent or permit flow of refrigerant therethrough, and means for operating said valve in response to the condenser pressure whereby said valve is opened when the condenser pressure is at a relatively low value and is closed when the condenser pressure reaches a predetermined higher value, said means for expanding refrigerant from said condenser and for conducting the same to said evaporator comprising a main line extending between said condenser and said evaporator, an expansion valve in said main line, and a check valve in said main line between said condenser and said expansion valve, and said by-pass line being connected with said main line between said check valve and said expansion valve for returning said withdrawn refrigerant to the system.

6. The combination in a refrigeration system utilizing a low boiling point refrigerant which flows in a closed cycle through said system and including an evaporator, a condenser, means for compressing refrigerant from said evaporator and for conducting the same to said condenser, and means for expanding refrigerant from said condenser and for conducting the same to said evaporator, of a by-pass line communicating with said condenser, a pump in said by-pass line for withdrawing refrigerant from said condenser and for boosting the pressure of the withdrawn refrigerant above the condenser pressure, a common drive means for both said pump and said compressing means which drive means includes a drive shaft connected between said pump and said compressing means, means for returning the withdrawn refrigerant to the system for flow through said evaporator and said compressing means and back to said condenser, a valve in said by-pass line operable to prevent or permit said flow of refrigerant therethrough, and means for operating said valve in response to the condenser pressure whereby said valve is opened when the condenser pressure is at a relatively low value and is closed when the condenser pressure reaches a predetermined higher value, said means for expanding refrigerant from said condenser and for conducting the same to said evaporator comprising a main line extending between said condenser and said evaporator, and an expansion valve in said main line, said by-pass line being connected with said main line between said expansion valve and said evaporator for returning said withdrawn refrigerant to the system, and a second expansion valve located in said by-pass line between said first mentioned valve in said by-pass line and said main line.

References Cited in the file of this patent
UNITED STATES PATENTS 2,244,312     Newton _____ June 3, 1941
2,949,750     Kramer _____ Aug. 23, 1960